(12) United States Patent
Coca et al.

(10) Patent No.: US 12,340,957 B2
(45) Date of Patent: Jun. 24, 2025

(54) TOOL FOR OPERATING A T-BLADE SWITCH ON A TRANSFORMER

(71) Applicant: Consolidated Edison Company of New York, Inc., New York, NY (US)

(72) Inventors: Arcangelo Coca, Staten Island, NY (US); Lauren Zaluk, Staten Island, NY (US)

(73) Assignee: CONSOLIDATED EDISON COMPANY OF NEW YORK, INC., New York, NY (US)

( * ) Notice: Subject to any disclaimer, the term of this patent is extended or adjusted under 35 U.S.C. 154(b) by 335 days.

(21) Appl. No.: 17/809,929

(22) Filed: Jun. 30, 2022

(65) Prior Publication Data
US 2024/0006131 A1 Jan. 4, 2024

(51) Int. Cl.
*B25G 1/00* (2006.01)
*H01H 1/14* (2006.01)
*H02G 1/02* (2006.01)

(52) U.S. Cl.
CPC .............. *H01H 1/14* (2013.01); *B25G 1/00* (2013.01); *H02G 1/02* (2013.01)

(58) Field of Classification Search
CPC .......... H01H 1/14; H01H 9/0271; H02G 1/02; H01R 11/12; H01R 11/14; H01R 43/00; H01R 43/26; B25B 13/10; B25B 13/28; B25B 13/481; B25B 13/50; B25B 23/10; B25B 23/16; B25B 27/00; B25B 27/02; B25B 27/14; B25B 27/24; B25B 33/00; B25G 1/04; B25G 1/063; B25G 3/00; B25G 1/00; B25J 1/04

See application file for complete search history.

(56) References Cited

U.S. PATENT DOCUMENTS

| | | | | | |
|---|---|---|---|---|---|
| 3,057,233 | A | * | 10/1962 | Turner | H01R 43/042 81/383 |
| 4,196,761 | A | * | 4/1980 | Royer | B25G 1/005 81/436 |
| 4,507,105 | A | * | 3/1985 | Stottmann | F16B 2/08 74/609 |
| 5,456,278 | A | * | 10/1995 | Morris | B25G 1/005 81/176.1 |
| 5,593,196 | A | * | 1/1997 | Baum | B25J 1/04 403/328 |
| 6,128,981 | A | * | 10/2000 | Bondhus | B25B 13/56 81/177.4 |
| 7,000,897 | B2 | * | 2/2006 | Chick | F16K 31/46 251/293 |
| 9,381,628 | B1 | * | 7/2016 | Garza | B25B 13/505 |

(Continued)

*Primary Examiner* — Robert J Scruggs
(74) *Attorney, Agent, or Firm* — CANTOR COLBURN LLP (57) ABSTRACT

An actuating tool for a switch on a transformer is provided. The switch being rotatable between a plurality of positions. The actuating tool includes an elongated pole having a predetermined length having a first end and an opposing second end. An actuator element is arranged on the first end of the pole, the actuator element being configured to engage the switch. A handle member rotatably coupled to the pole between the first end of the second end, the handle member being movably coupled to rotate between a first position substantially parallel to the pole and a second position substantially perpendicular to the pole.

16 Claims, 12 Drawing Sheets

(56) References Cited

U.S. PATENT DOCUMENTS

| | | | |
|---|---|---|---|
| 9,493,995 B2* | 11/2016 | Hamed | B25G 1/102 |
| 2015/0270674 A1* | 9/2015 | Sook | B25J 1/04 |
| | | | 29/748 |
| 2018/0126541 A1* | 5/2018 | Jeremenko | B25H 1/0035 |

* cited by examiner

TOOL FOR OPERATING A T-BLADE SWITCH ON A TRANSFORMER

BACKGROUND OF THE DISCLOSURE

The subject matter disclosed herein relates to an electrical transformer, and in particular to a tool for operating a T-blade switch on a transformer, such as a pad mounted transformer for an underground residential distribution system for example.

In electrical distribution systems, such as underground residential distribution (URD) systems for example, a transformer is provided for changing the characteristics of the distributed electricity to be appropriate for the attached loads. These transformers typically includes an actuating mechanism, sometimes referred to as a T-blade switch, that allows personnel from the electrical utility operate the switch which deenergize the coils.

Typically a fixed length switch sticks is used to move the actuator, this in turn isolates portions of the feeder lines to allow work to be performed within desired safety limits. When operating the T-blade switch the utility personnel rotates the switching stick well past 90 degrees (~130 degrees) to get the actuator into the next position. The prior art switch stick used by utility personnel is a substantially round pole with a coupling member on the end. The coupling member engages the actuator on the T-blade switch, which allows the actuator to be rotated.

The T-Blade switch is a make-before-break type switch that uses a strong spring to move the switch position. In the event that an operation cannot be completed in one motion, it is permissible to relax, regrip the switch stick and complete the operation by moving in the same direction. It is however not permissible to reverse direction before completing the rotation in progress. The mechanism could jam, making the switch inoperable. The current switch stick is not ergonomic and may result in the utility personnel experiencing soft tissue injuries in the wrists and shoulders or overextending their back leaning over the transformer.

While existing actuating tools for T-blade switches are suitable for their intended purposes the need for improvement remains, particularly in providing an actuating tool having the features described herein.

BRIEF DESCRIPTION OF THE DISCLOSURE

According to one aspect of the disclosure, an actuating tool for a switch on a transformer is provided. The switch being rotatable between a plurality of positions. The actuating tool includes an elongated pole having a predetermined length having a first end and an opposing second end. An actuator element is arranged on the first end of the pole, the actuator element being configured to engage the switch. A handle member rotatably coupled to the pole between the first end of the second end, the handle member being movably coupled to rotate between a first position substantially parallel to the pole and a second position substantially perpendicular to the pole.

According to another aspect of the disclosure, a method of actuating a T-blade switch on a transformer is provided. The method includes engaging an end of an actuator tool with an actuator on the T-blade switch, the actuator tool having an elongated pole that extends away from the transformer when the end is engaged. A handle on the actuator tool is rotated from a first position to a second position, the second position being substantially perpendicular to a longitudinal axis of the pole. A force is applied to the handle to rotate the actuator from a third position to a fourth position. The actuator tool is disengaged from the actuator.

According to yet another aspect of the disclosure an actuator tool for a T-blade switch on a transformer is provided. The T-blade switch include an actuator on an external surface. The actuator tool includes an elongated pole having a predetermined length having a first end and an opposing second end, the elongated pole being made from an electrical insulator fiberglass material. An actuator element is provided on the first end of the pole, the actuator element being configured to engage the switch. A handle member is rotatably coupled to the pole between the first end of the second end, the handle member being movably coupled to rotate between a first position substantially parallel to the pole and a second position substantially perpendicular to the pole, the handle member being made from an electrical insulator fiber glass material.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION OF THE DISCLOSURE

Embodiments of the present disclosure provide for an actuating tool that allows utility or service personnel to actuate a T-blade switch on an electrical transformer. Further embodiments of the present disclosure provide for an actuating tool that allows utility or service personnel to actuate a T-blade switch while standing upright while switching submersible transformers Referring now to FIG. 1, an embodiment of a prior art pad mounted transformer 100 is shown. Transformers of this type typically include a housing 102 that encloses the electrical components, such as coils and switches (not shown). In some embodiments, the transformer 100 will also include electrical connections that distribute electrical power to one or two electrical feeder lines. It should be appreciated that it may be desirable from time to time to change the operation of the transformer 100 to allow for servicing or repair of the transformer 100 or the electrical circuits coupled to the transformer.

Figure 1:
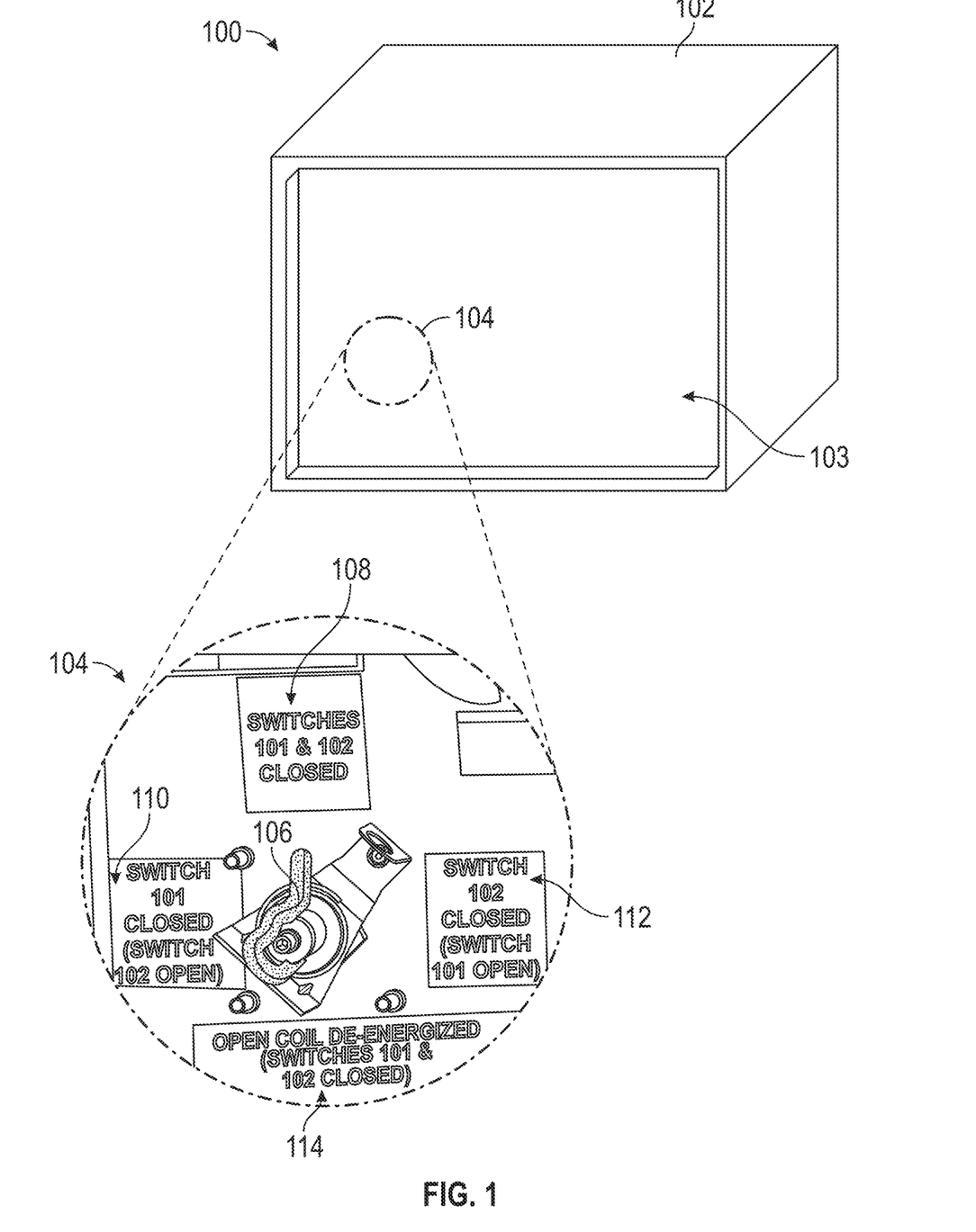
FIG. 1 is a perspective view of a pad mounted transformer in accordance with an embodiment.

In some embodiments, the transformer 100 includes a recessed area 103 with a plurality of controls and/or connectors that allow the utility or service personnel to monitor or change the operation of the transformer. In an embodiment, recessed area 103 may be enclosed by a cover to prevent unauthorized access. One type of control is referred to as a T-blade switch 104. The switch 104 is connected to internal switches with the transformer 100 that open and/or close in response to the rotation of an actuator 106. The actuator 106 may be rotated between a plurality of positions with each position corresponding to a different configuration within the transformer 100. For example, position 108 may correspond to both internal switches being closed (e.g. power flows to both feeder lines), while position 110 or position 112 may correspond to one of the internal switches being open and the other being closed). Finally, the actuator 106 may include a fourth position 114 where both internal switches are closed however the transformer coil is open and deenergizes the secondary.

The T-blade switch 104 is biased to prevent inadvertent movement of the actuator 106 between positions. As a result, the rotation of the switch 104 requires utility or service personnel to apply significant torque and to rotate the actuator past the position 108, 110, 112, 114. Typically the switch 104 requires a rotation of up to 40 degrees past the desired position. The typical tool used to rotate the T-blade switch 104, sometimes referred to as a "hotstick", has a generally smooth cylindrical body that is difficult to apply torque to. Further, when used in a sub-surface transformer, the prior art hotstick requires the utility or service personnel to lean over the transformer when applying the torque.

Referring to FIGS. 2A-2G an actuating tool 200 is shown for engaging the actuator 106 and rotating the T-Blade switch 104. The tool 200 includes a body 202 having a first end 204 with an actuator element 206. The body 202 may come in a variety of lengths, such as 4 feet (1.22 meters) or 6 feet (1.83 meters) for example. In an embodiment, the body 202 is made from an electrically insulative material such as fiberglass for example. Coupled to the body 202 is a handle bracket 208. The handle bracket 208 includes a body 210 having a semi-circular slot 212. In an embodiment, the slot 212 extends more than 180 degrees about an axis 214. In an embodiment, the axis 214 is co-axial with the axis of the body 202. In an embodiment, the body 210 includes a pair of opposing holes 216, 218 that are sized to receive compression pins 220, 222. In an embodiment, the holes 216, 218 have a centerline disposed on an angle relative to a centerline 224 that extends through the center of the handle bracket 208. In an embodiment the handle bracket 208 is made from an electrically insulative material, such as nylon 6/6 for example. In an embodiment, the compression pins are made from steel.

The handle bracket 208 includes a first projection 224 and a second projection 226 extending from the body 210. The projections 224, 226 define a slot 228 that is sized to receive a handle member 230. Each of the projections 224, 226 includes a hole to receive a pivot pin 232. In an embodiment, the pivot pin is made from an electrically insulative materials, such as a carbon fiber rod for example. In an embodiment, the handle member 230 includes an axis or centerline 234 that is offset from a centerline or axis 236 of the pivot pin 232. The offset of the axis 236 from the centerline 234 may provide advantages in allowing for clearance of the utility or service personnel's hand when grasping the handle member 230. As discussed in reference to FIGS. 3A-3C, the utility or service personnel rotate the handle member 230 about the pivot pin 232 from a first position (shown in FIG. 2A) to a second position. In an embodiment, the second position is substantially perpendicular to the centerline of the body 202. It should be appreciated that in the second position, the handle member 230 allows the utility or service personnel to apply more torque to the body 202 than if the utility or service personnel were gripping the body 202 by itself.

Figure 2A:
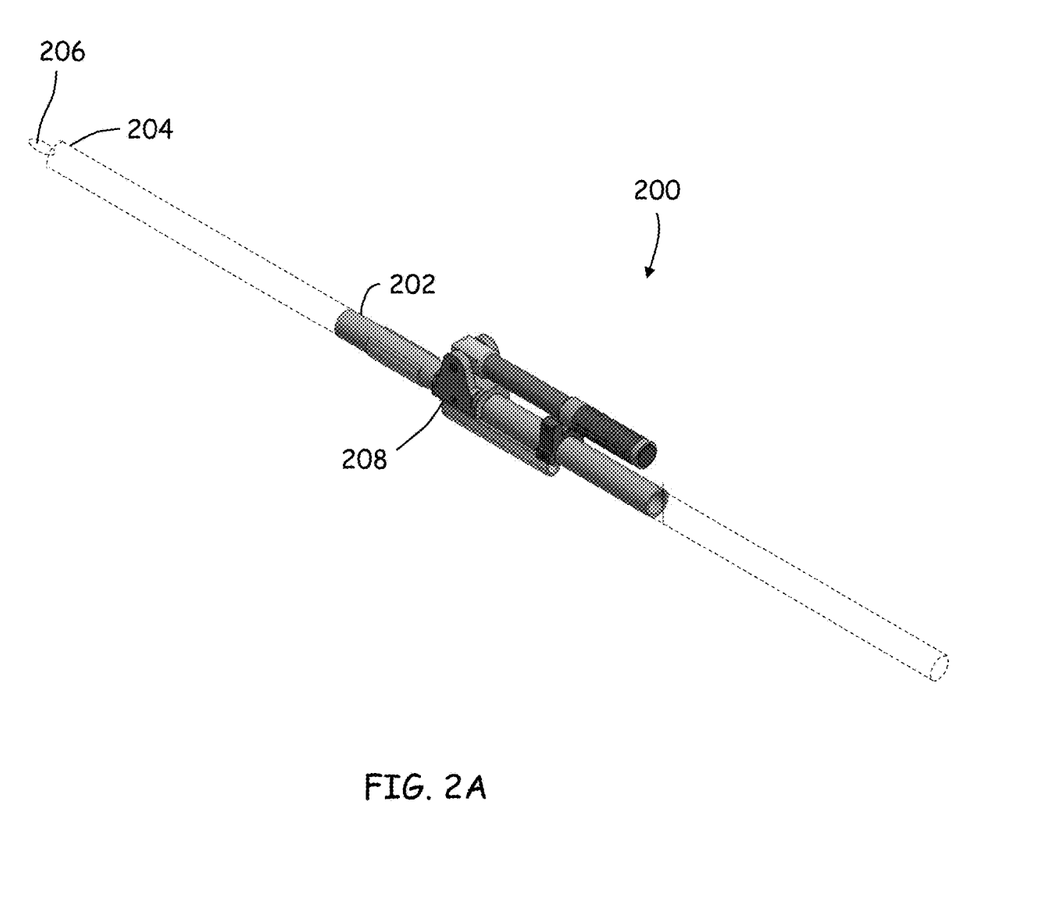
FIG. 2A is a perspective view of an actuating tool for a transformer in accordance with an embodiment.
Figure 2B:
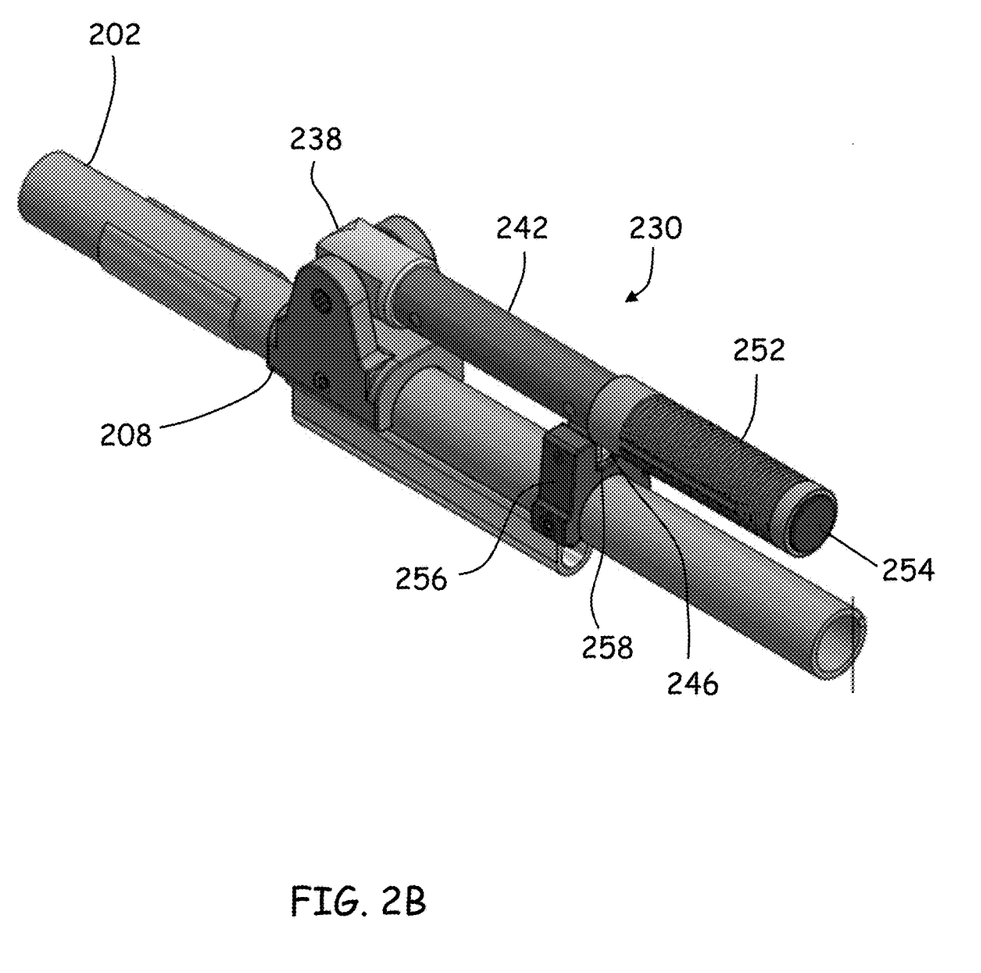
FIG. 2B is a perspective view of the handle portion of the actuating tool of FIG. 2A.
Figure 2C:
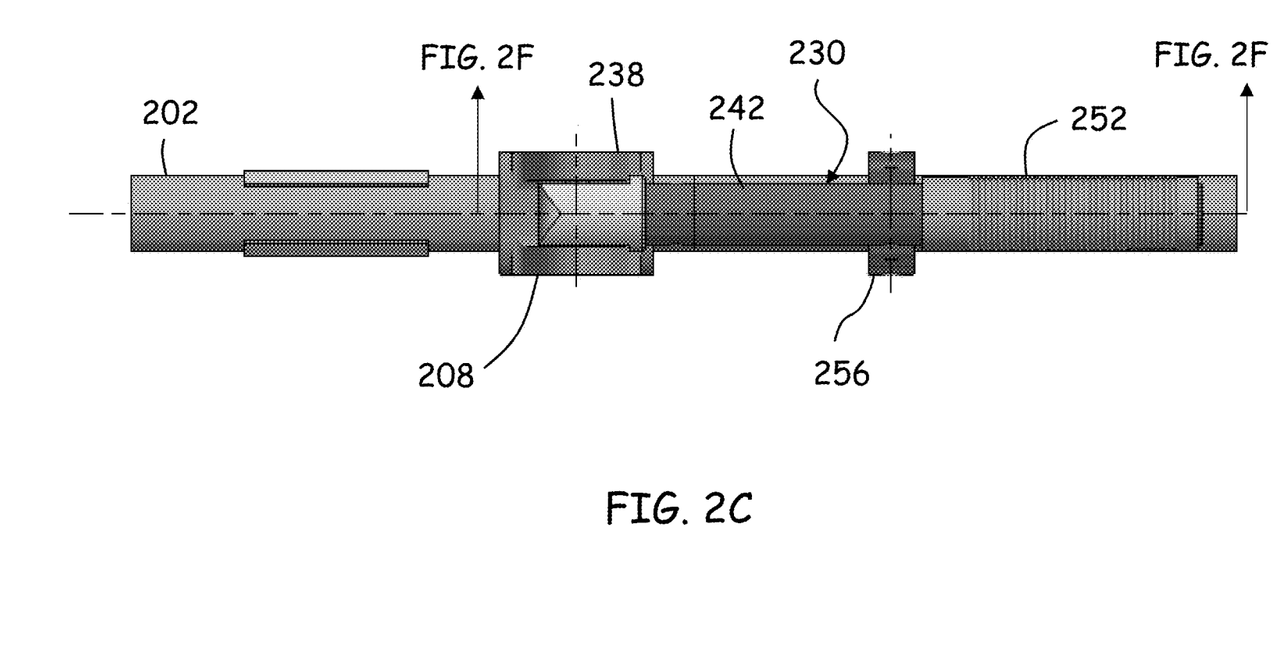
FIG. 2C is a top view of the handle portion of the actuating tool of FIG. 2A.
Figure 2D:
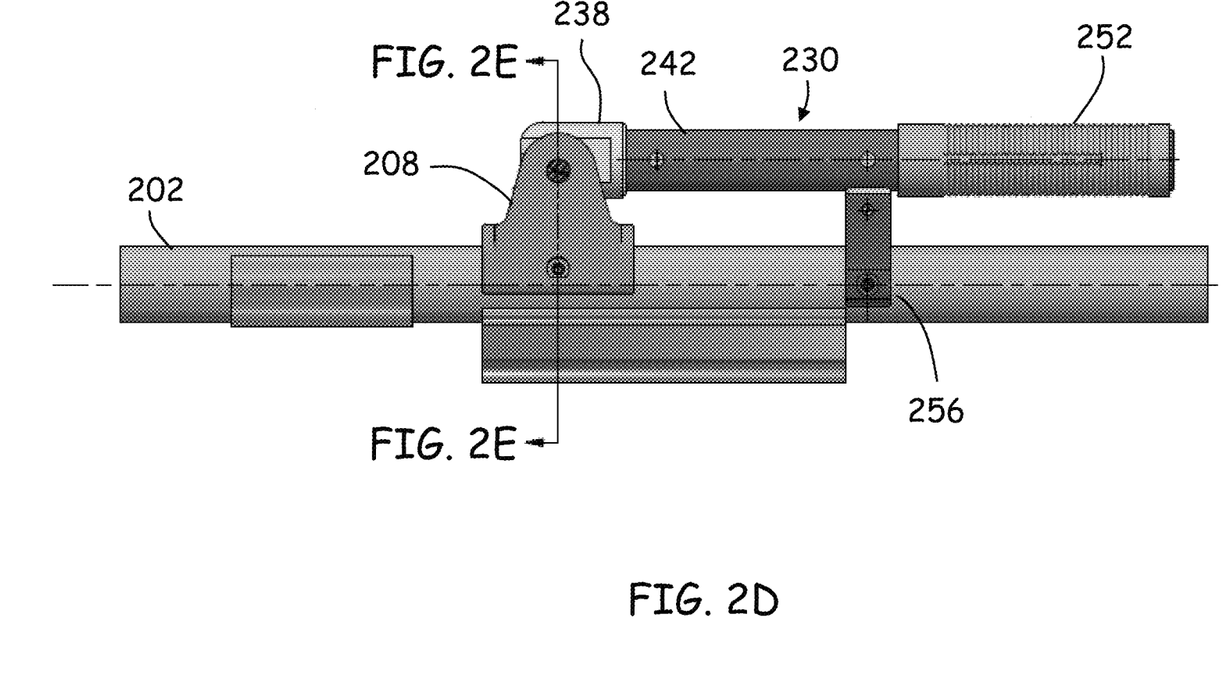
FIG. 2D is a side plan view of the handle portion of the actuating tool of FIG. 2A.
Figure 2E:
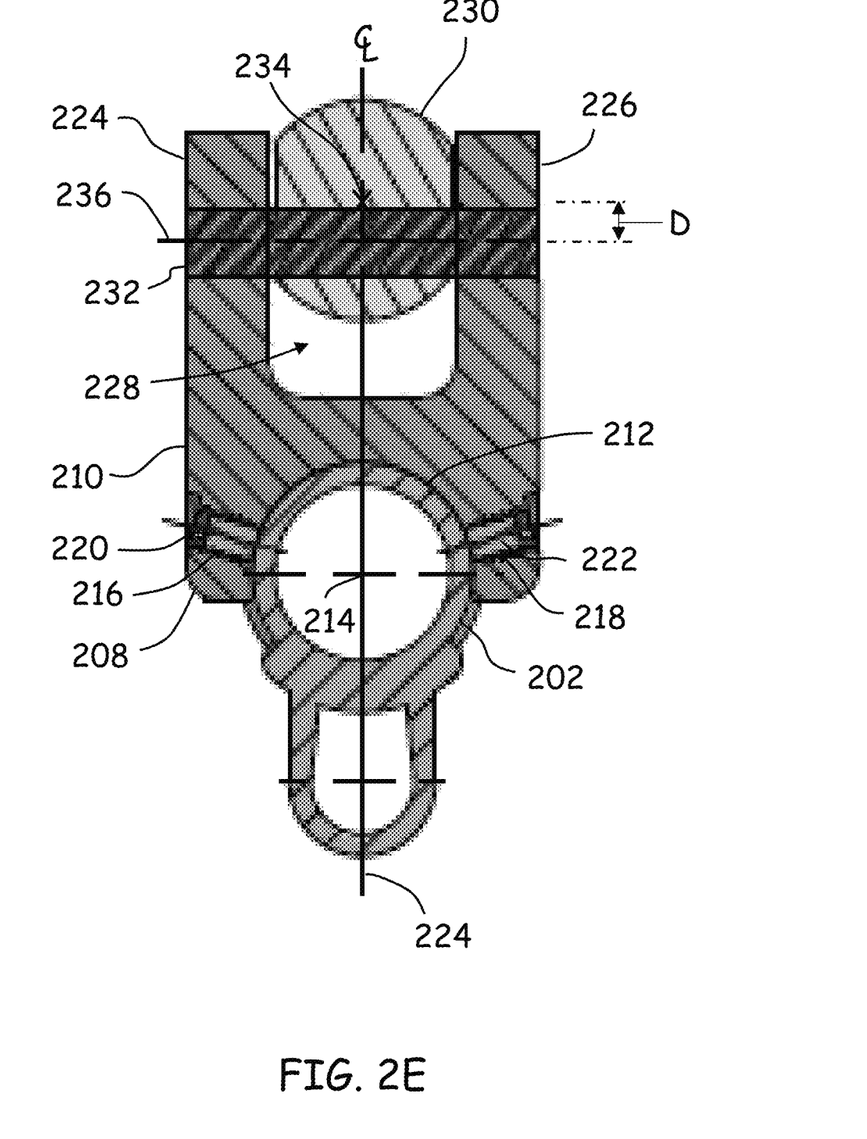
FIG. 2E is a sectional view of the handle portion of the actuating tool of FIG. 2A along the section line indicated in FIG. 2D.
Figure 2F:
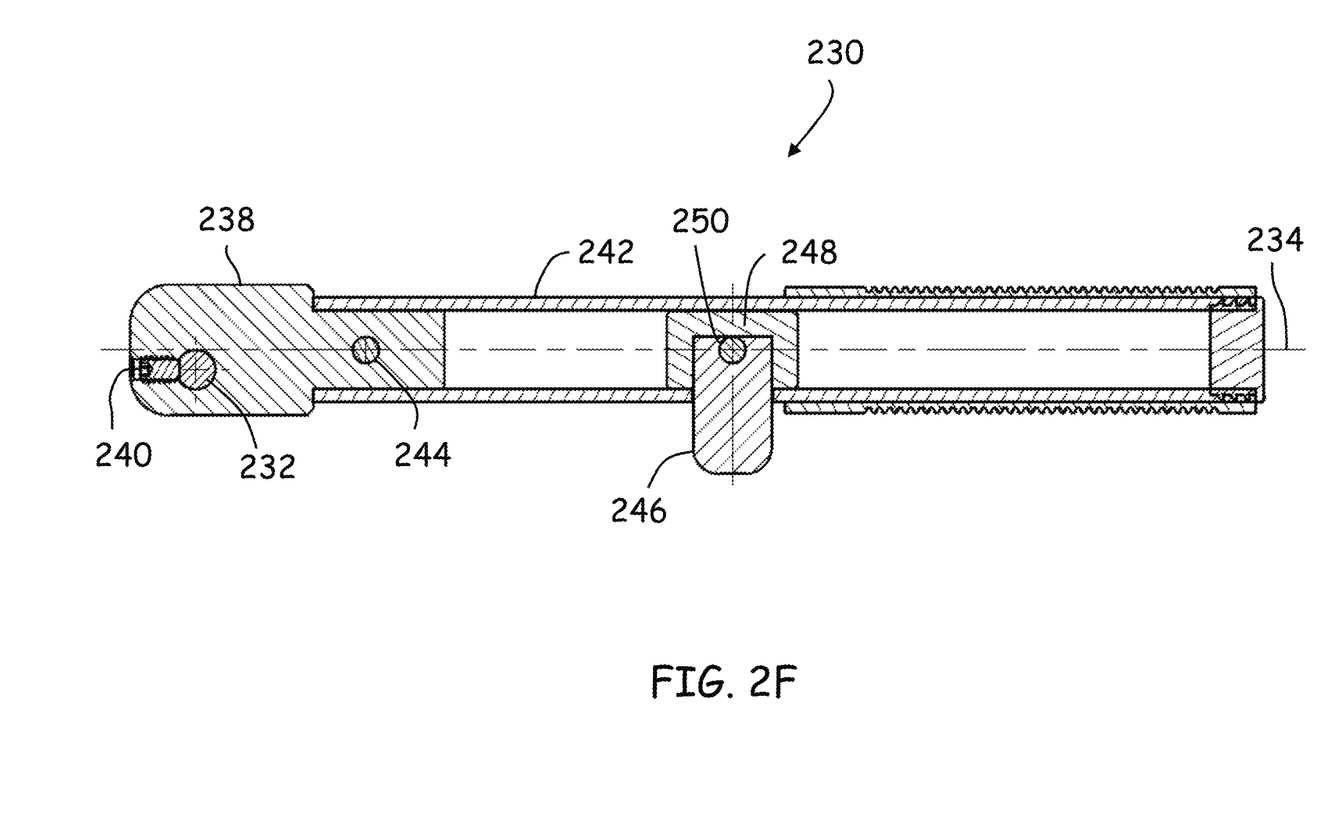
FIG. 2F is a sectional view of a handle member of the handle portion of FIG. 2A along the section line indicated in FIG. 2C.
Figure 2G:
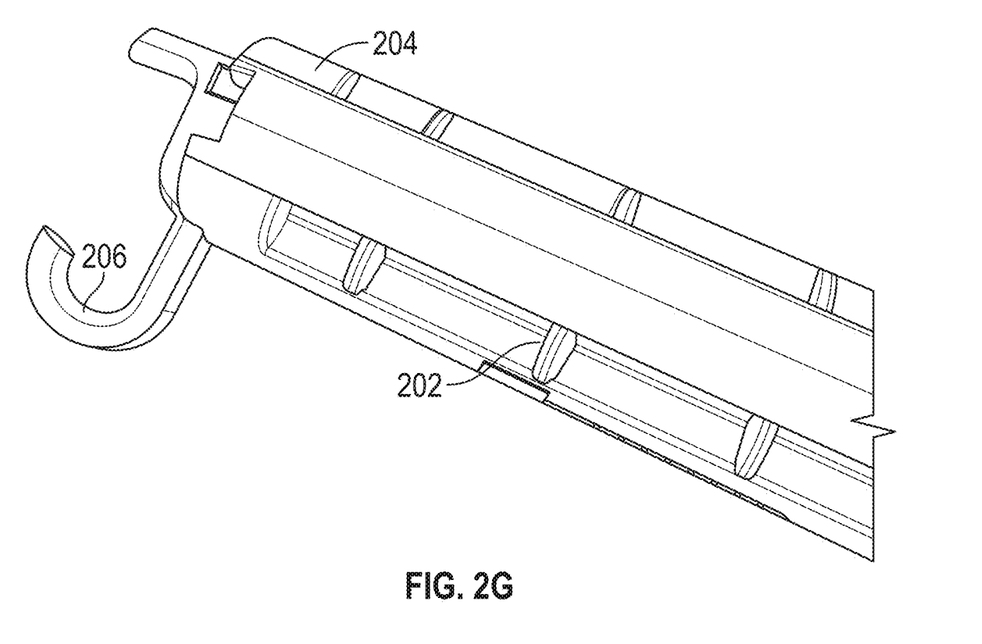
FIG. 2G is an enlarged portion of an actuating end of the actuating tool of FIG. 2A.

In an embodiment shown in FIG. 2F, the handle member 230 includes a handle cap 238 that couples to the handle bracket 208 by the pivot pin 232. In an embodiment, the pivot pin 232 is coupled to the handle cap 238 by a compression pin 240. In an embodiment, the handle cap 238 is made from an electrically insulative material, such as nylon 6/6 for example. The handle cap 238 is coupled to a handle body 242 by a pin 244. In an embodiment, the handle body is a cylindrical tube made from an electrically insulative material, such as fiberglass for example.

Coupled to the handle body 242 is a tang 246 that extends perpendicular to the centerline 234 toward the body 202. In an embodiment, the tang 246 may be made from an electrically insulative material, such as nylon 6/6 for example. In an embodiment, the tang 246 extends through a slot in the handle body 242 and is secured by a support member 248 and a pin 250. A grip 252 is disposed about the handle body 242 on an end opposite the handle cap 238. In an embodiment, a plug 254 is coupled to the end of the handle body 242 to enclose the end of the handle body 242. In an embodiment, the plug 254 is made from an electrically insulative material, such as nylon 6/6 for example.

In an embodiment, a support member 256 is coupled to the body 202. In an embodiment, the support member 256 includes a slot 258 that is sized to receive the tang 246. In an embodiment, the support member 256 is made from an electrically insulative material, such as nylon 6/6 for example.

Figure 3A:
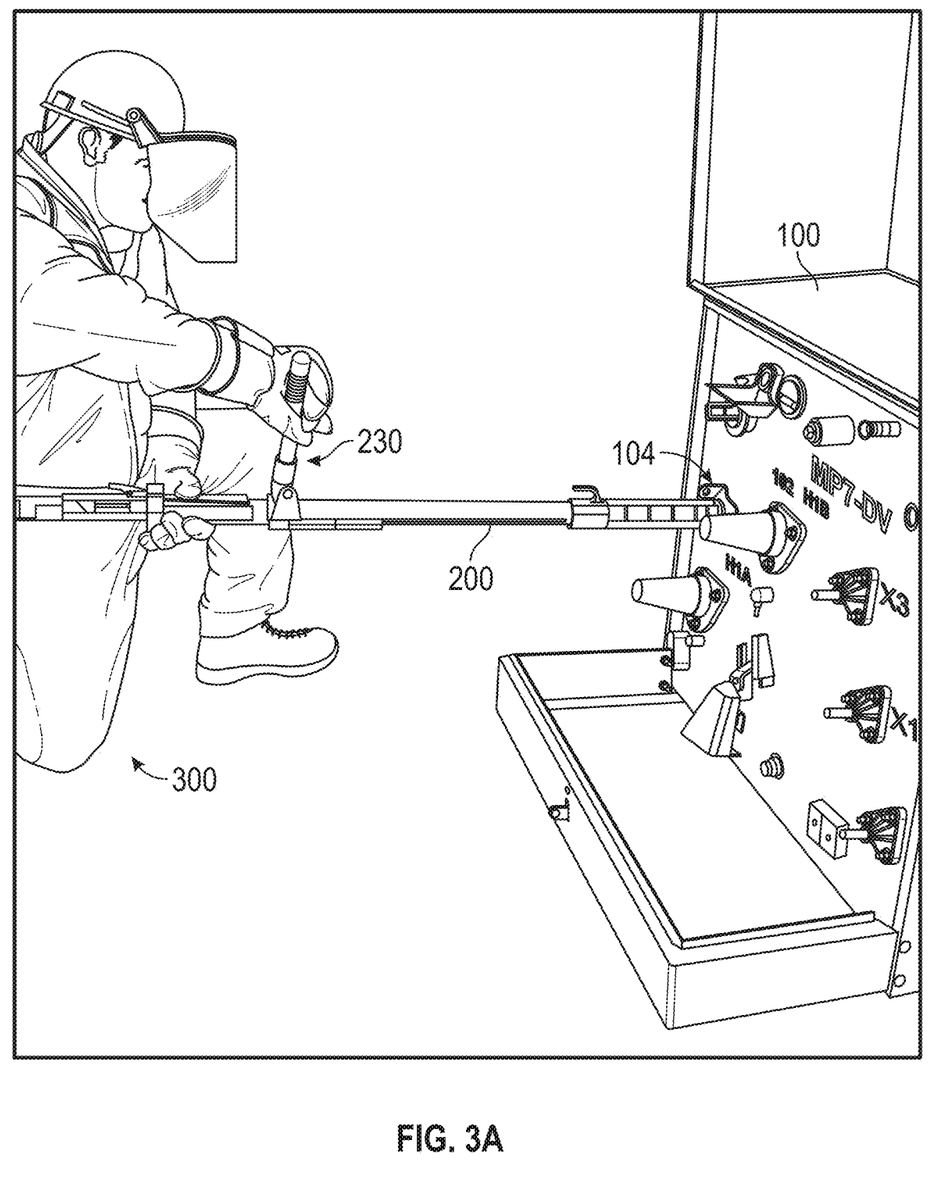
FIG. 3A-FIG. 3C illustrate a sequence of steps for rotating the actuating member of a T-blade switch on a pad mounted transformer using the actuating tool of FIG. 2A.
Figure 3B:
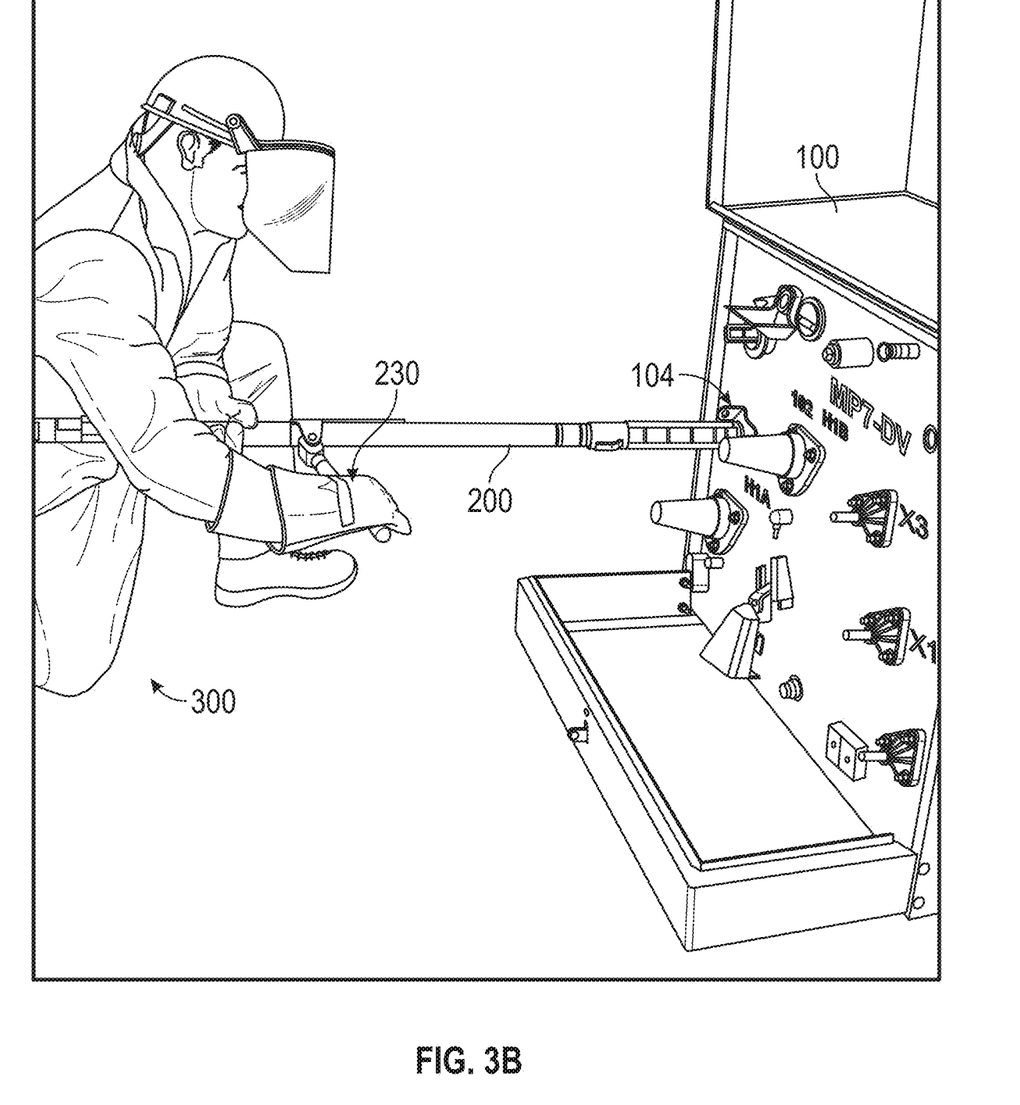
Figure 3C:
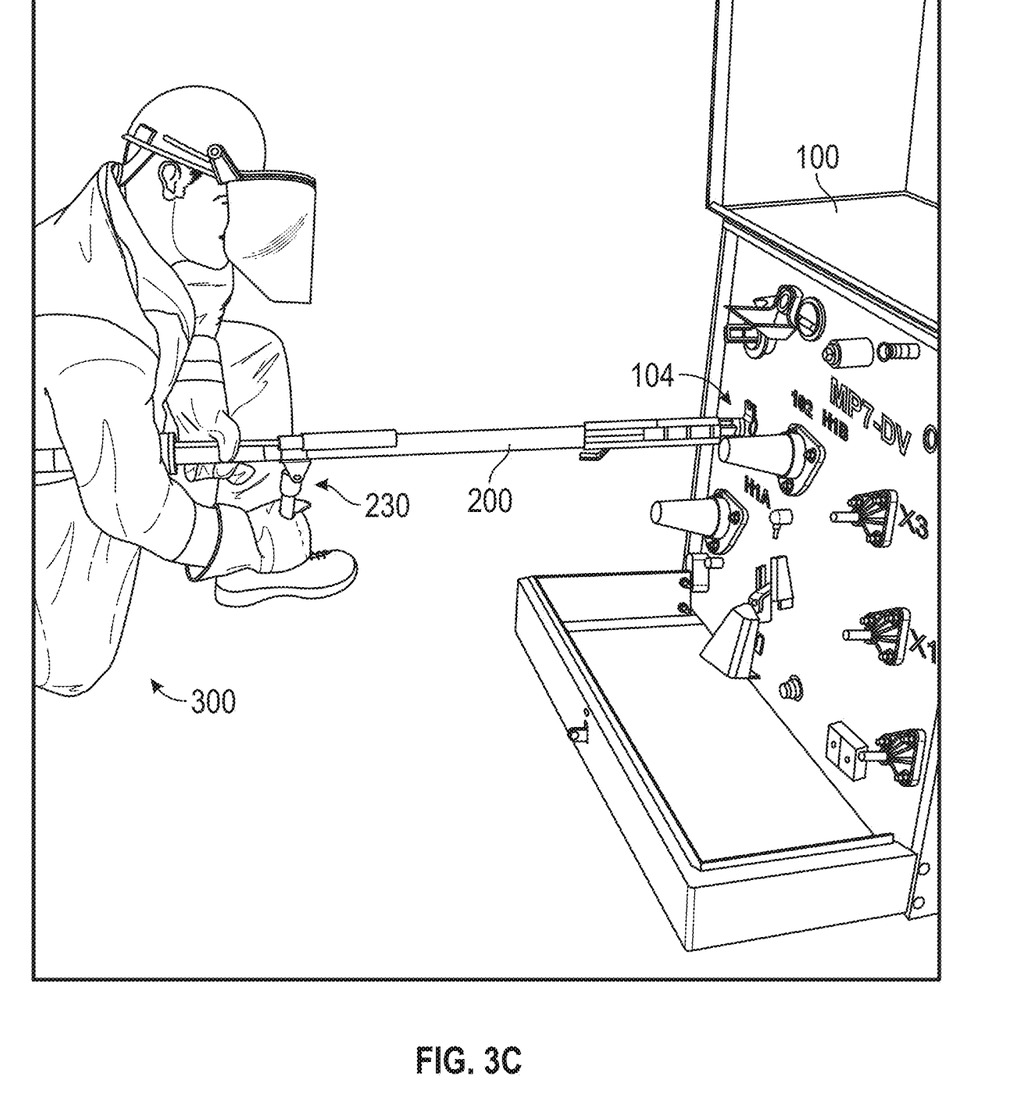

Referring now to FIGS. 3A-3C, an embodiment is shown of a utility or service personnel 300 operating the tool 200 to change the position of the T-blade switch 104 on a pad mounted transformer 100. The utility or service personnel 300 first engages the actuator element 206 with the actuator 106 and rotates the handle member 230 from the first position to the second position (FIG. 3A). By applying a force to the side of the handle member 230, the actuator 106 rotates (FIG. 3B). To secure the actuator 106 in the desired position, the utility or service personnel rotates the tool 200 past the desired position of the actuator 106 by a predetermined amount (e.g. up to 40 degrees, FIG. 3C) and then removes the torque from the tool 200.

Figure 4:
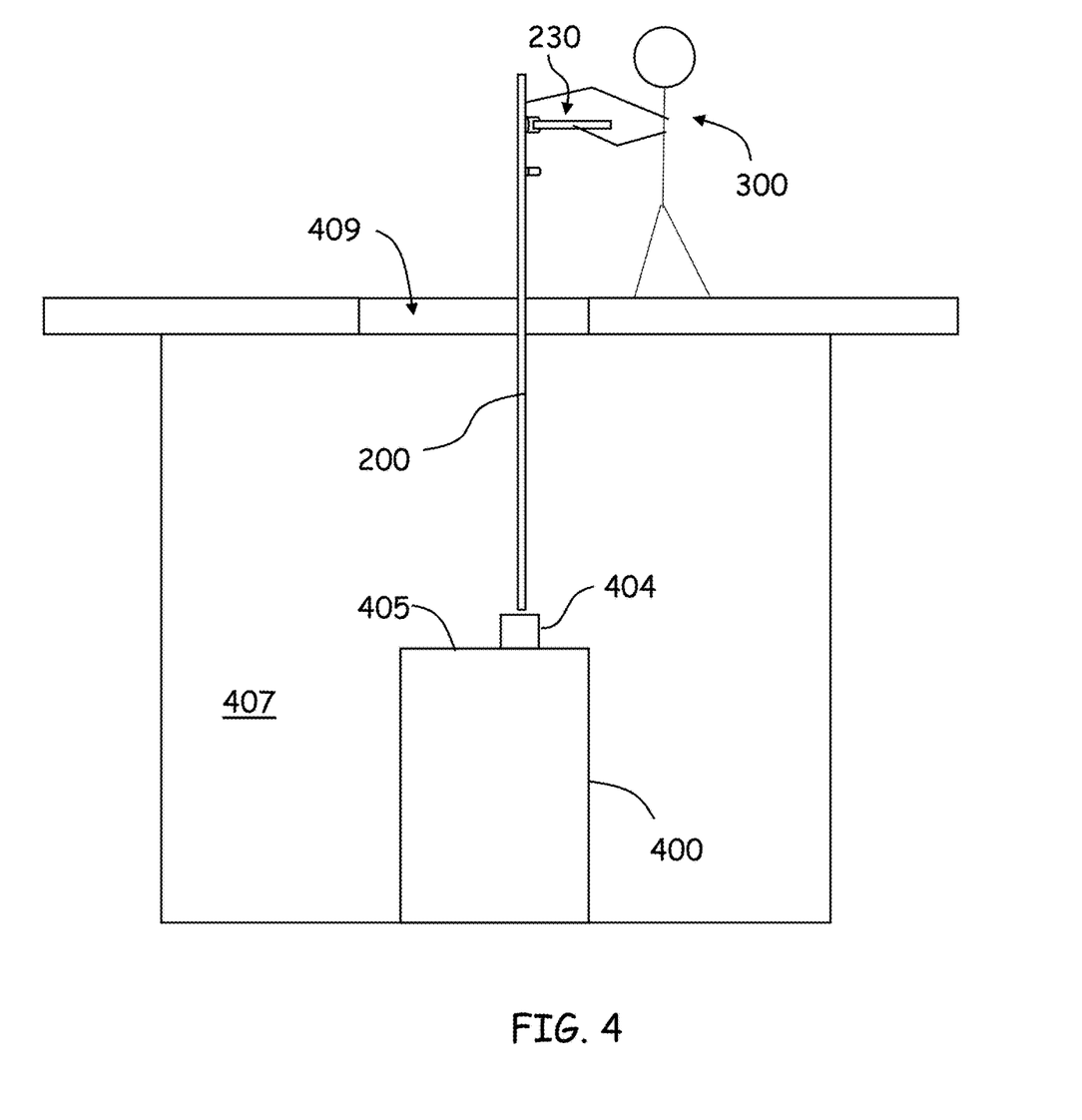
FIG. 4 is a schematic illustration of a using the actuating tool of FIG. 2A to rotate the actuating member of a T-blade switch on a submersible transformer.

Referring to FIG. 4, an embodiment is shown where the tool 200 is used with a submersible transformer 400. A submersible transformer 400 is similar to a pad mounted transformer 100 except that the T-Blade Switch 404 is positioned on a top surface 405. The transformer 400 may be located in an underground or subterranean chamber or vault 407, which is accessible through an opening 409. It should be appreciated that when the utility or service personnel 300 rotates the handle member 230 to the second position (FIG. 4), advantages are provided over prior art hotstick because the utility or service personnel 300 does not need to lean over the transformer 400.

The term "about" or "substantially" is intended to include the degree of error associated with measurement of the particular quantity based upon the equipment available at the time of filing the application. For example, "about" or "substantially" can include a range of ±8% or 5%, or 2% of a given value.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection." It should also be noted that the terms "first", "second", "third", "upper", "lower", and the like may be used herein to modify various elements. These modifiers do not imply a spatial, sequential, or hierarchical order to the modified elements unless specifically stated.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. An actuating tool for a switch on a transformer, the switch being rotatable between a plurality of positions, the actuating tool comprising:
    an elongated pole having a predetermined length having a first end and an opposing second end;
    a handle member rotatably coupled to the pole between the first end and the second end, the handle member being movably coupled to rotate between a first position substantially parallel to the pole and a second position substantially perpendicular to the pole;
    an actuator element on the first end of the elongated pole, the actuator element being configured to engage the switch and to cause the switch to rotate when a force is applied to the handle member, the force being applied rotationally around an axis extended longitudinally through a center of the elongated pole;
    a handle bracket fixedly coupled to the pole, the handle bracket defining a center line that extends through a center axis of the pole and a center axis of the handle member, the handle bracket including a first hole and a second hole on opposite sides of a semi-circular slot, the first hole and second hole are disposed on an angle relative to the center line,
    wherein the first hole and second hole each have an axis that substantially extends through a longitudinal centerline of the pole.

2. The actuating tool of claim 1, wherein the handle bracket has a body with the semi-circular slot and at least one projection, the semi-circular slot sized to receive the pole, the handle member being rotationally coupled to the at least one projection.

3. The actuator tool of claim 2, wherein:
    the handle member includes a first axis extending along the length of the handle member; and
    a pivot connects the handle member to the at least one projection, the pivot having a second axis that is substantially perpendicular to the first axis, the second axis being offset from the first axis.

4. The actuator tool of claim 3, further comprising a tang member coupled to the handle member between a first end of the handle member and an opposing second end of the handle member, at least a portion of the tang member extending from the handle member substantially perpendicular to the first axis.

5. The actuator tool of claim 4, further comprising a support member fixedly coupled to the pole a predetermined distance from the handle bracket, the support member having a body with a slot sized to receive the tang member, the support member being positioned to receive the tang member in the slot when the handle member is in the first position.

6. The actuator tool of claim 2, further comprising a pair of compression pins disposed in the first hole and second hole and engaging the pole to fixedly couple the handle bracket to the pole.

7. A method of actuating a T-blade switch on a transformer, the method comprising:
    engaging an end of an actuator tool with an actuator of the T-blade switch, the actuator tool having an elongated pole that extends away from the transformer when the end is engaged;
    rotating a handle on the actuator tool from a first position to a second position, the second position being substantially perpendicular to a longitudinal axis of the pole;
    applying a perpendicular force to the handle to rotate the actuator from a third position to a fourth position, wherein the force is applied rotationally around an axis extended longitudinally through a center of the elongated pole; and
    disengaging the actuator tool from the actuator,
    wherein a handle bracket is fixedly coupled to the pole, the handle bracket defining a center line that extends through a center axis of the pole and a center axis of the handle member, the handle bracket including a first hole and a second hole on opposite sides of a semi-circular slot, the first hole and second hole are disposed on an angle relative to the center line, wherein the first hole and second hole each have an axis that substantially extends through a longitudinal centerline of the pole.

8. The method of claim 7, further comprising the rotation from the third position to the fourth position is greater than 90 degrees.

9. The method of claim 8, further comprising rotating the actuator from the fourth position to a fifth position due to a biasing element in the transformer.

10. The method of claim 9, wherein the fifth position is offset from the third position by about 90 degrees.

11. The method of claim 10, further comprising rotating the handle from the second position to the first position when the actuator is rotated to the fifth position and disengaging the actuator tool from the actuator in response rotating the handle from the second position to the first position.

12. An actuator tool for a T-blade switch on a transformer, the T-blade switch having an actuator on an external surface, the actuator tool comprising:
   an elongated pole having a predetermined length having a first end and an opposing second end, the elongated pole being made from an electrical insulator fiberglass material;
   a handle member rotatably coupled to the pole between the first end of the second end, the handle member being movably coupled to rotate between a first position substantially parallel to the pole and a second position substantially perpendicular to the pole, the handle member being made from an electrical insulator fiber glass material; and
   an actuator element on the first end of the elongated pole, the actuator element being configured to engage the switch and to causes the switch to rotate when a force is applied to the handle member, the force being applied rotationally around an axis extended longitudinally through a center of the elongated pole,
   a handle bracket fixedly coupled to the pole, the handle bracket defining a center line that extends through a center axis of the pole and a center axis of the handle member, the handle bracket including a first hole and a second hole on opposite sides of a semi-circular slot, the first hole and second hole are disposed on an angle relative to the center line,
   wherein the first hole and second hole each have an axis that substantially extends through a longitudinal centerline of the pole.

13. The actuating tool of claim 12, wherein the handle bracket has a body with the semi-circular slot and at least one projection, the semi-circular slot sized to receive the pole, the handle member being rotationally coupled to the at least one projection, the handle bracket being made from an electrical insulator nylon 6/6 material.

14. The actuator tool of claim 13, wherein:
   the handle member includes a first axis extending along the length of the handle member; and
   a pivot connects the handle member to the at least one projection, the pivot having a second axis that is substantially perpendicular to the first axis, the second axis being offset from the first axis, the pivot being made from a carbon fiber rod.

15. The actuator tool of claim 14, further comprising a tang member coupled to the handle member between a first end of the handle member and an opposing second end of the handle member, at least a portion of the tang member extending from the handle member substantially perpendicular to the first axis, the tang member being made from an electrically insulator nylon 6/6 material.

16. The actuator tool of claim 15, further comprising a support member fixedly coupled to the pole a predetermined distance from the handle bracket, the support member having a body with a slot sized to receive the tang member, the support member being positioned to receive the tang member in the slot when the handle member is in the first position, the support member being made from an electrically insulator nylon 6/6 material.

* * * * *